United States Patent [11] 3,602,596

[72] Inventors Robert W. Astheimer
 Westport;
 Morris Weiss, Stamford, Conn.; Philippe Villers, Concord, Mass.
[21] Appl. No. 727,120
[22] Filed Apr. 5, 1968
 Continuation-in-part of Ser. No. 359,221, Apr. 13, 1964, abandoned
[45] Patented Aug. 31, 1971
[73] Assignee Barnes Engineering Company
 Stamford, Conn.

[54] ROUGHNESS TESTING METERS
 7 Claims, 9 Drawing Figs.
[52] U.S. Cl. .................................................. 356/51,
  356/106, 356/120
[51] Int. Cl. ........................................................ G01n 21/34
[50] Field of Search .......................................... 356/51,
  106, 113, 120, 237

[56] References Cited
 UNITED STATES PATENTS
 3,222,978 12/1965 Dreyfus .................... 88/14
 3,336,833 8/1967 Villers ....................... 88/14
 FOREIGN PATENTS
 602,459 5/1948 Great Britain ............ 106 (II)/H6 B Primary Examiner—Ronald L. Wibert
Assistant Examiner—Paul K. Godwin
Attorneys—Robert Ames Norton, Joseph Levinson and John E. Benoit ABSTRACT: A roughness meter for measuring r.m.s. roughness, especially in the range from about 1–5 $\mu$in., the meter providing a choice of at least two wavelength bands of illumination, at least one being in the infrared. The wavelength of illumination, or more precisely the reflected radiation, is preferably from 20–50 times the r.m.s. roughness. The radiation is reflected onto various curved surfaces, such as toroidal surfaces of ball bearing races. In every case a reflecting surface is used which causes the beam of radiation to strike all points of the surface at substantially normal incidence, and there is in the beam path no material which has a significant refractive index which is wavelength dependent. Air is preferred. Reflected light is detected and an electrical output is produced which is a measure of the r.m.s. reflectance. The reflecting surface may be a portion of an ellipsoid or a parabolaoid. In the first case the beam of radiation is focused at one of the conjugate foci of the ellipse and the bearing space is accurately positioned so that the center of its curvature is at the other conjugate focus. In the case of a parabola, of course, collimated light is used.

INVENTOR
ROBERT W. ASTHEIMER
MORRIS WEISS
BY PHILIPPE VILLERS
ATTORNEY

*INVENTOR.*
ROBERT W. ASTHEIMER
MORRIS WEISS
PHILIPPE VILLERS

BY

*Robert Ames Norton*
ATTORNEY

ROUGHNESS TESTING METERS

RELATED APPLICATIONS

This application is a continuation in part of our application No. 359,221 filed Apr. 13, 1964, and now abandoned.

BACKGROUND OF THE INVENTION

A number of toroidal surfaces are known which require precise roughness measurements. The term "toroidal" is used in its broad sense of a surface of revolution having two radii of curvature. The most important single example is a ball bearing race but there is no limitation to the radius of curvature in a plane containing the axis of the torus. It is thus included, as a special case, cylindrical and conical surfaces in which this particular radius of curvature is infinitely large. It is frequently necessary to measure very highly polished toroidal surfaces particularly in a range of r.m.s. roughness in the range of from about 1 to 5 $\mu$in. Such roughness cannot be measured practically with ordinary roughness testing equipment, such as profilometers. Even on samples having flat surfaces useful measurements cannot be made below 10 or 15 $\mu$in. Profilometers are almost unusable on toroidal surfaces in which there are two curvatures both of finite radius of curvature such as ball bearing races. In the laboratory, of course, interferometers can be used but such measuring instruments are too slow and too expensive for practical factory inspection. As a result ball bearing races have been ground and polished as well as could be managed with a pious hope that the roughness was in the right range.

A very important new technique for measuring r.m.s. roughness has been developed utilizing reflection at substantially normal incidence. This can be used with either single color or two color radiometers and the present invention is not concerned particularly with the radiometer design. The radiation used for measurement is in wavelength ranges which are much longer than the r.m.s. roughness, for example, more than 10 times and preferably between 20 and 50 times. It will be noted that while the minimum wavelength for roughness measurements around 1 $\mu$in. falls in the visible, the wavelengths for the preferred ranges for the most part fall in the infrared. This flies in the face of ordinary optical practice where the shorter the wavelength of measuring radiation the greater the accuracy. The use of the long wavelength was required because while the basic measurement involving a ratio or comparison of specular reflectance of the rough surface with specular reflectance of the smooth surfaces involves an expression in which wavelength appears as the square, there is another error due to varying r.m.s. slope of the surface roughness in which the wavelength appears in the fourth power. A longer wavelength in the range set out above retains adequate sensitivity, if it is not more than 50 times r.m.s. roughness, while rendering the error term "due to slope" negligible. This improved method of roughness measurement and an improved form of instrument using a multiple range single-color radiometer is described and claimed in the patent to Villers, No. 3,336,833.

SUMMARY OF THE INVENTION

The present invention uses at least two wavelength bands of radiation at least one of which is in the infrared. The beams for each of the selected wavelength ranges are reflected by a curved reflecting surface so that they strike a toroidal surface such as a race of a ball bearing at substantially normal incidence. The surface can either be a portion of an ellipsoid or revolution or a paraboloid. In the first case the beam of radiation is focused at one of the conjugate foci of the ellipsoid and the ball bearing race is placed in the instrument so that the center of the circular curvatures of the toroid lie in the line of the other conjugate foci of the ellipsoid. In the case of a paraboloid, collimated light is used and the centers are in the line of foci of the paraboloid.

It is essential that the path through which the radiation beam passes and the radiation is reflected from the toroidal surface is through a medium that does not have any significant refractive index which is wavelength dependent. In ordinary instruments this path will be air, and such media as glass, which have significant indices which change with wavelength are inoperative.

The present invention is not concerned with any particular type of radiometer, except of course that it must be responsive to radiation of the particular band selected in the instrument for any particular roughness measurement. The requirement for the reflecting surface is an essential limitation but not extremely critical in use, because if the radiation strikes the toroidal surface very slightly off normal incidence, it is still possible to use the machine, but if the departure is more than a very few degrees, errors are introduced which degrade the accuracy of roughness measurements to the point where they are no longer practically useful.

The present invention should not be confused with a Fizeau interferometer which has been proposed for comparing a toroidal surface with a reference surface on a glass element in the radiation path, the reference surface having a center of curvature through which the illumination beam is focused. Departures from exact correspondence of the toroidal surface with the reference surface are measured interferometrically by counting interference fringes. Such a device is completely inoperative in the present invention even if suitable radiometers were used, because the path is through a medium of which the refractive index is both significant and changes with wavelength. The instrument can only be used for its entirely different purpose with monochromatic light. It is incapable of measuring r.m.s. roughness, which requires more than one band of radiation. The interferometer cannot measure roughness at all and merely compares one curved surface with another.

The present invention illuminates the toroidal surface at all points substantially normal. The simplest instruments involve radiometer placements so that their axes coincide with that of the ellipsoid or paraboloid. The reflected beam from the surface tested for roughness can, however, be folded by suitable folding mirrors to match any particular convenient placement. Such mirrors are considered for the purpose of the present invention as part of the radiometer collecting optics.

With the ball bearing races in which the toroidal surface has two curvatures with finite radii the surface of revolution and illuminating system are so formed and arranged that illumination always passes through the center of curvature of the surface of the torus in any plane containing the axis. The other curvature is not significant because it is concentric with the axis of the surface of revolution and so for the remainder of the specification the former is the only curvature considered.

In the case of ball bearing races the curvatures of the race surfaces are circular and, therefore, the centers of curvature for each cross section on the race surfaces are to be found in a circle concentric with the axis of revolution of the reflecting surface of revolution. The reflecting surface of revolution may be of several types. It may be essentially an elliptical surface, a parabolic surface, referring, of course, to the shape of the curve which generates the surface when revolved, or it may be a cone. If the illumination in any of the chosen wavelength bands is in the form of a convergent beam the elliptical surface is required to be positioned in such a way that the beam of illuminating radiation passes through the centers of curvature of the toroidal surface as defined above. It then will strike the illuminated portion of the surface always at normal incidence which is the requirement for accuracy of roughness measurement set out above. It is also possible to use collimated light in which the surface of revolution is that of a parabola, the curvature and separation from the toroidal surface being, of course, chosen so that the illuminating beam passes through the centers of curvature of the toroidal surface.

The form using a cone, as a surface of revolution, is directly usable only with outer ball bearing races. It is applicable, but only with additional mirror elements, for the measurement of inner races. The cone must be associated with focusing means in the illuminating beam which are accurately positioned with respect to the cone so that illumination is focused in a circle which is the locus of the centers of curvature of the toroidal surface.

Either modification, that is, using the surface of revolution as a focusing element or only as a folding element, in the case of a cone, are included in the present invention and they have advantages and disadvantages. The elliptically curved surface has some advantages in requiring fewer elements in the illuminating system for internal race than does the cone, which must have an additional reflecting surface. The parabolically curved surface has the advantage that it is not sensitive to axial location with respect to the toroidal surface but does require collimation. All of the modifications referred to above are useful in the present invention, but particularly for outer races the cone has some advantages in cheapness of manufacture. For inner races elliptically or parabolically curved surfaces present some advantages.

The toroidal surface may have a radius of curvature which is infinite, in other words a cylinder or a cone. The conical modification may be used with collimated or convergent light. In the case of the cylinder the reflecting cone must be a 90° cone but can be used with convergent light of sufficiently small convergence. In the case of a conical surface the reflecting cone angle will depend on the angle of the surface. Cylindrical surfaces can be either internal or external and require either an external cone surface or the inner surface of a hollow cone respectively. Collimated light has an advantage if it is desired to move the reflecting cone independently of the rest of the optical system.

When a fully reflecting surface of revolution is used, either curved or conical, the whole of the toroidal surface will be illuminated and the reflected beam which strikes the radiometer will, therefore, produce a measurement which is the average of the roughness of the whole bearing race or of a band or line on a cylindrical or conical surface. For production inspection purposes this is the preferred modification. However, when the instrument is to be used in research it is sometimes desirable to be able to measure the roughness of small bands in the surface. In such a case only a portion of the surface of revolution is reflecting and the toroidal surface can be revolved with respect to it to produce a series of measurements around the torus.

DESCRIPTION OF THE PREFERRED EMBODIMENTS

Figures 1, 2, 3:
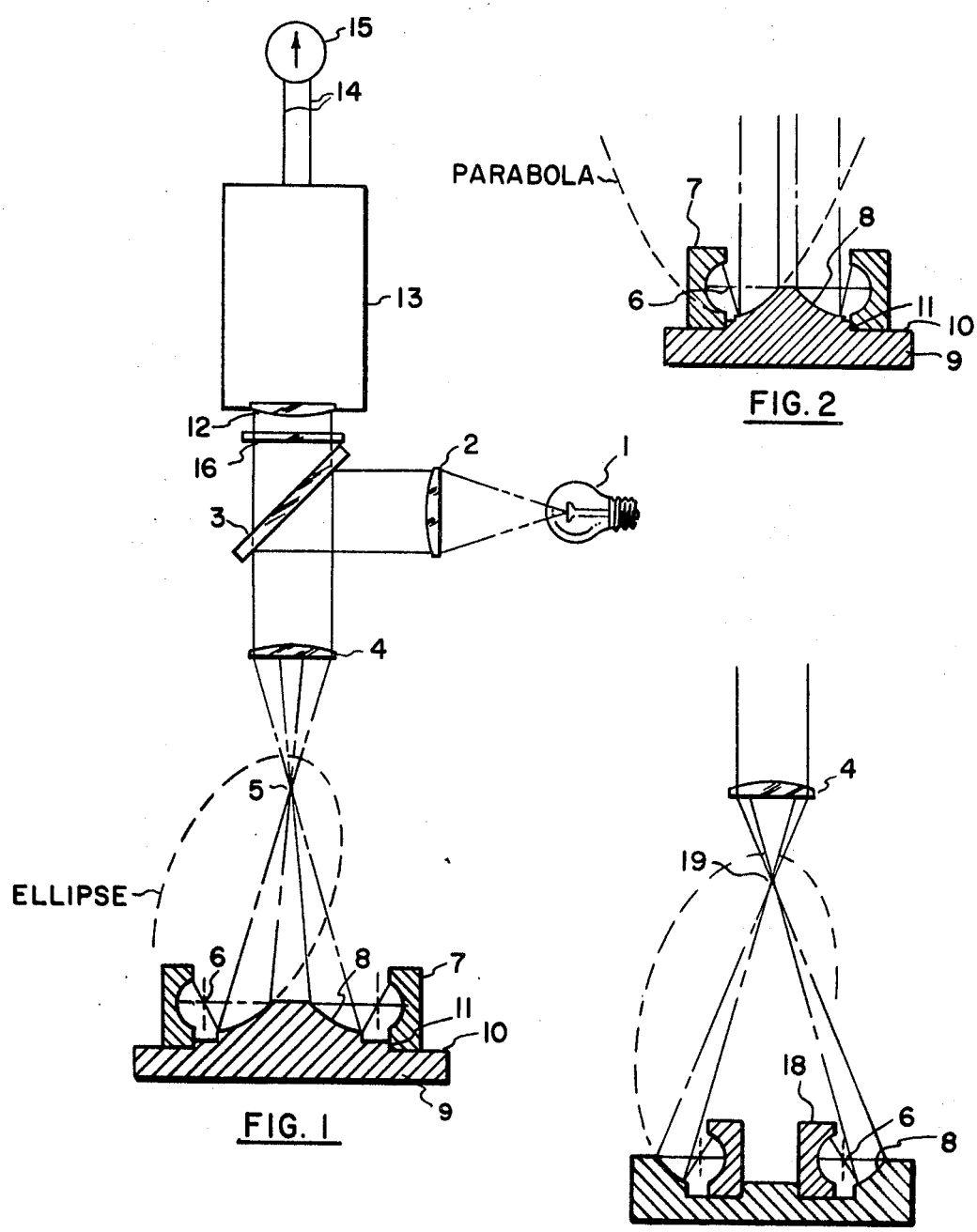
FIG. 1 is a section through a tester for outer bearing races incorporating elliptical curvature.
FIG. 2 is a similar section using a parabolically curved surface.
FIG. 3 is a section through a tester for inner bearing races using elliptically curved surfaces.

In FIG. 1 an illuminating beam is produced from a lame (1), a collimating lens (2) and a beam splitter (3). This beam is focused by a lens (4) onto one focus (5) of an elliptical surface of revolution (8), the beam being imaged in points (6) at the other focus of the elliptical surface around a circle which is the locus of the centers of curvature of an outer bearing cage (7) to be tested. The surface (8) is rigidly mounted on a jug (9) the center of which is concentric with the illuminating beam and is provided with a surface at (10) and locating shoulder (11) so that the bearing race (7) is properly located.

The illumination of the outer race passing through the center of curvature of the race surfaces at all points strikes the race surface substantially at normal incidence and is reflected back through the lens (4) where it is recollimated and passes through the beam splitter (3) onto the entrance pupil (12) of a radiometer (13). The radiometer has an output symbolized by the wires (14) leading to a meter (15). The radiometer and meter may be calibrated to read r.m.s. roughness, that is to say an output proportional to the ratio of the reflectance as compared to the reflectance of a perfectly smooth surface of the same material. The radiometer entrance pupil is preferably provided with a filter (16) which selects a band of radiation of wavelength from 20 to 50 times r.m.s. roughness. The instrument provides at lease two wavelength bands, in other words has at least two filters. The exact mechanical design of interposing successive filters into the reflected beam is not the essence of the present invention. The filters can be introduced successively by hand, in suitable filter holders. Filter wheels, or any other convenient means for introducing more than one filter successively into the beam may be used. In order not to complicate the drawings with structure of which the particular design forms no part of the present invention, the filter (16) is shown as simply one of which can be introduced by hand. It should be noted that FIG. 1 in this respect is essentially diagrammatic. While it is essential to the present invention that the instrument be capable of measuring reflected radiation in more than one wavelength range, the internal design of the radiometer is not changed by the present invention.

Figures from 2 on show only the reflection surface of revolution, incoming beam and surface to be measured. It should be noted in FIG. 2 that the lens (4) is omitted, and the surface (8) is parabolically curved. The collimated light required is reflected through the centers of curvature (6) of the race (7) in the same manner as with the elliptical reflecting surface of FIG. 1.

FIG. 3 differs somewhat from FIG. 1 although the same elements bear the same reference numerals. In this case, however, the elliptical reflecting surface is shown at (8) focusing the radiation through centers of curvature (6) of an inner bearing race (18). Except for the different shape of the surface of revolution the operation is substantially the same. It will be noted that as in FIG. 1 there is a focal point of the lens (4) at (19) which point is a conjugate focus of the elliptical surface. The other conjugate focus, of course, is at (6).

Figure 4:
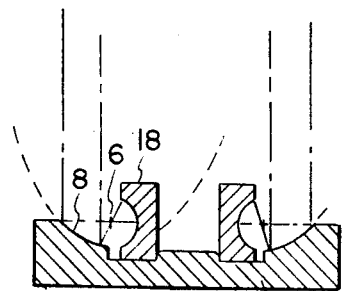
FIG. 4 is a similar section using parabolically curved surfaces.

FIG. 4 is similar to FIG. 3, the reflecting surface being parabolically curved. Otherwise, there is no change and the measurement of the roughness of the inner bearing race is effected in the same manner as in FIG. 2.

Figure 5:
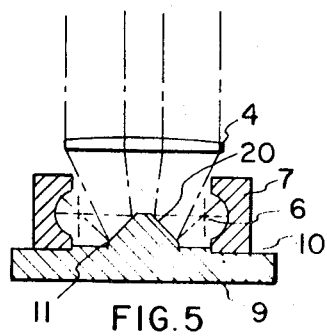
FIG. 5 is a section through a tester for outer bearing races using a cone.

FIG. 5 is similar to FIG. 1 but instead of the surface of lens (4) produce a convergent beam and is spaced from the cone so that the illuminating beam is again focused on the centers of curvature (6) of the bearing race.

Figure 6:
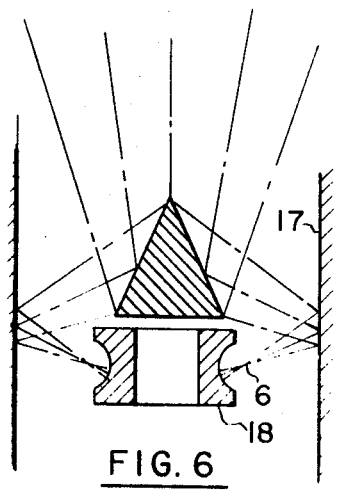
FIG. 6 is a similar section for inner races.

FIG. 6 illustrates the use of a reflecting cone for measuring an inner bearing race. There is required, however, an additional cylindrical reflecting surface (17). It will be noted that the additional reflecting surface is required only for the inner race whereas the curved surfaces of revolution shown in FIGS. 3 and 4 do not require the additional element.

Figure 7:
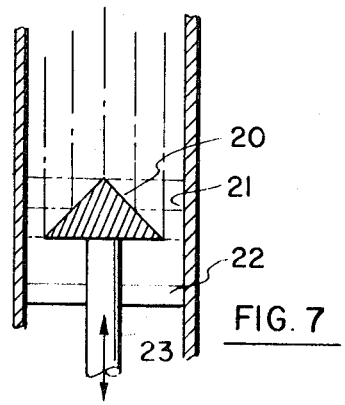
FIG. 7 is a section through a tester for inner cylindrical surfaces.

FIG. 7 shows the measurement of an internal cylindrical surface (21). A cone (20) is used as in the preceding FIG. 5 the incoming radiation being collimated. In other words, the lens (4) is omitted. The cone (20) is maintained in the center of the cylinder by spacing arms (22) mounted on a central shaft (23) which can be moved into and out of the cylinder as represented by the double arrow thus making it possible to investigate the roughness of various bands throughout the height of the cylinder. It will be noted that the cone must be a right angle cone so that the collimated light is reflected out to strike the cylindrical surface at normal incidence.

Figure 8:
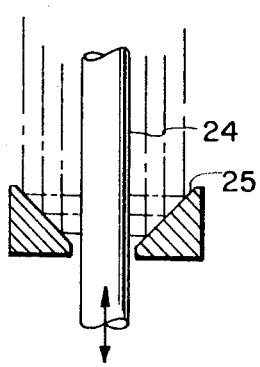
FIG. 8 is a section through a tester for outer cylindrical surfaces.

FIG. 8 illustrates a similar tester for measuring external cylindrical surfaces such as those of a shaft (24). In this case collimated light is still needed as is shown but the reflecting surface is the inside conical surface (25). The apex of the cone is, of course, truncated to provide a suitable opening through which the shaft to be measured is introduced. The shaft is moved vertically to measure the roughness of different bands and is maintained accurately concentric with the cone surface (25) by suitable guides (not shown).

Figure 9:
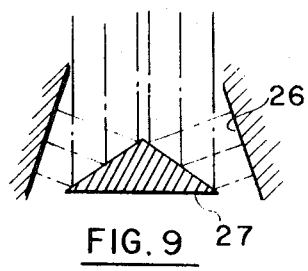
FIG. 9 is a section through a tester for inner conical surface.

FIG. 9 illustrates the illumination of a conical surface (26) using collimated light and a reflecting cone (27). It will be noted that the shape of the cone is somewhat different than in the case of FIG. 7 and its angle will be dependent on the slope of the conical surface (26) so that the reflected rays will strike the surface (26) at normal incidence.

I claim:

1. In a roughness testing meter for measuring the r.m.s. roughness of concave toroidal surfaces, which instrument comprises radiometric means capable of responding to radiation bands having minimum wavelengths of more than 10 times r.m.s. roughness, the illuminating means forming a beam along the axis of the revolution of the toroidal surface, and radiometric means positioned to receive reflected illumination from the illuminated toroidal surface said radiometric means producing an output which is a function or r.m.s. roughness, the improvement which comprises
   a. means for successively selecting at least two wavelength bands of reflected radiation to the radiometric means, at least one of these bands being in the infrared,
   b. a reflecting surface in the form of a surface of revolution about the axis of the illumination beam and the toroidal surface to be measured, said reflecting surface being positioned to reflect light onto the toroidal surface at approximately normal incidence,
   c. the instrument having an all-reflecting path for the illuminating beam to the toroidal surface, said path consisting of a medium which transmits infrared radiation and has a wavelength-independent refractive index approximating that of air.

2. A meter according to claim 1 in which the path of the illumination beam to the toroidal surface is through air.

A roughness meter according to claim 1 in which the reflecting surface of revolution is an ellipsoid and the toroidal surfaces have circular cross sections in a plane containing the axis of the torus, the illuminating beam and reflecting surface position being adjusted to image a small illuminating source onto the successive points of a circle concentric with the torus axis and being the locus of the centers of curvature of the concave toroidal surface.

4. A roughness tester according to claim 1 for measuring toroidal surfaces having circular curvature in the plane containing the torus axis, in which the reflecting surface of revolution is a parabolic surface of revolution, the illuminating means producing collimated light and the parabolic reflecting surface imaging a small light source onto a circle concentric with the torus axis which circle is the locus of the centers of curvature of the toroidal surface.

5. A roughness meter according to claim 1 in which each selected wavelength band of reflected light has a minimum wavelength of from 20 to 50 times r.m.s. roughness measured in this range.

6. A roughness meter according to claim 3 in which each selected wavelength band of reflected light has minimum wavelength of from 20 to 50 times r.m.s. roughness measured in this range.

7. A roughness meter according to claim 4 in which each selected wavelength band of reflected light has a minimum wavelength of from 20 to 50 times r.m.s. roughness measured in this range.